Sept. 18, 1951 C. H. SPARKLIN 2,567,975
ELECTRIC IRON
Filed May 4, 1945 3 Sheets-Sheet 1

Inventor:
Charles H. Sparklin,
By Chritton, Wiles, Schroeder,
Merriam, & Hofgren, Attys.

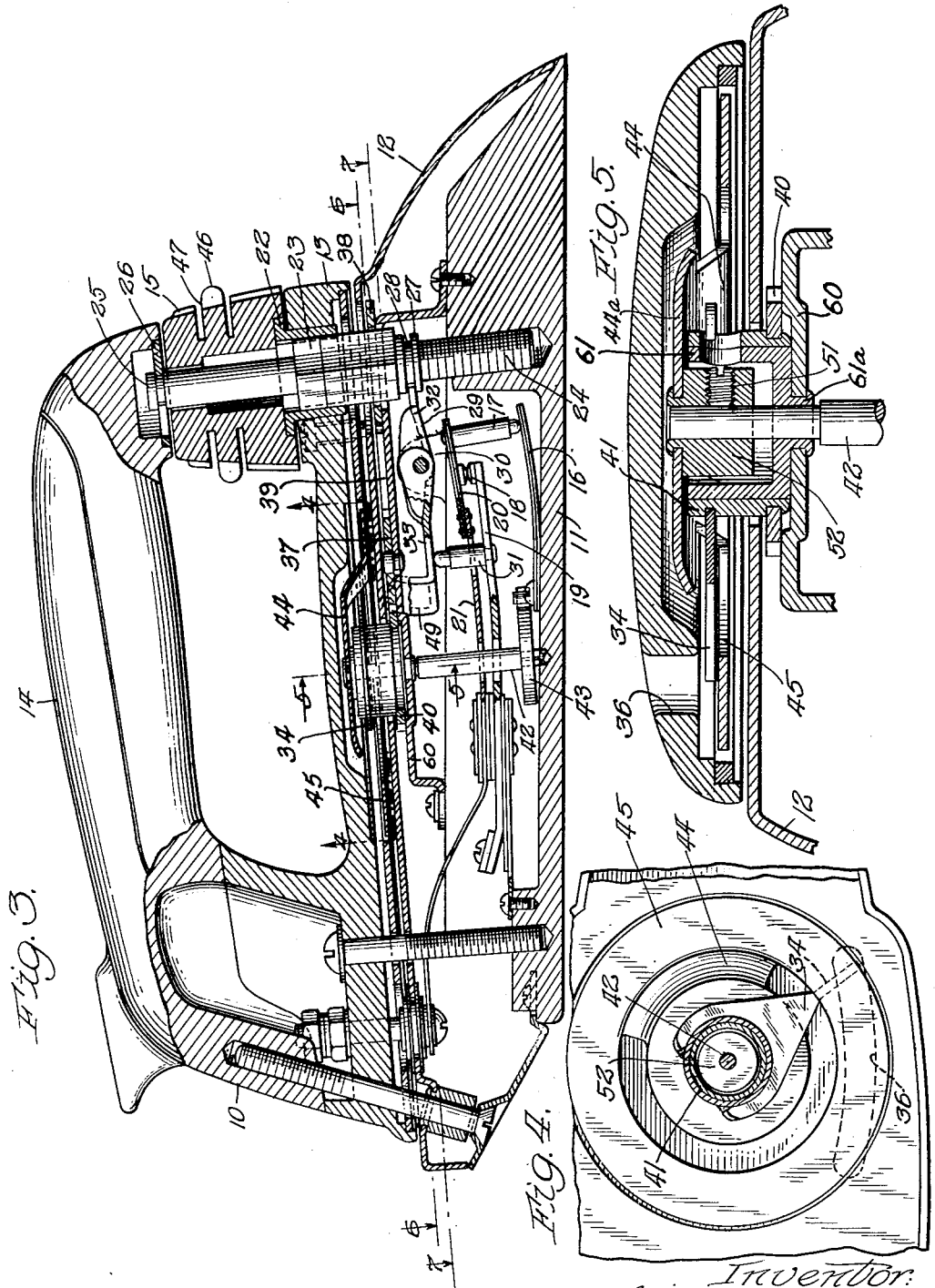

Sept. 18, 1951     C. H. SPARKLIN     2,567,975
ELECTRIC IRON
Filed May 4, 1945     3 Sheets-Sheet 3
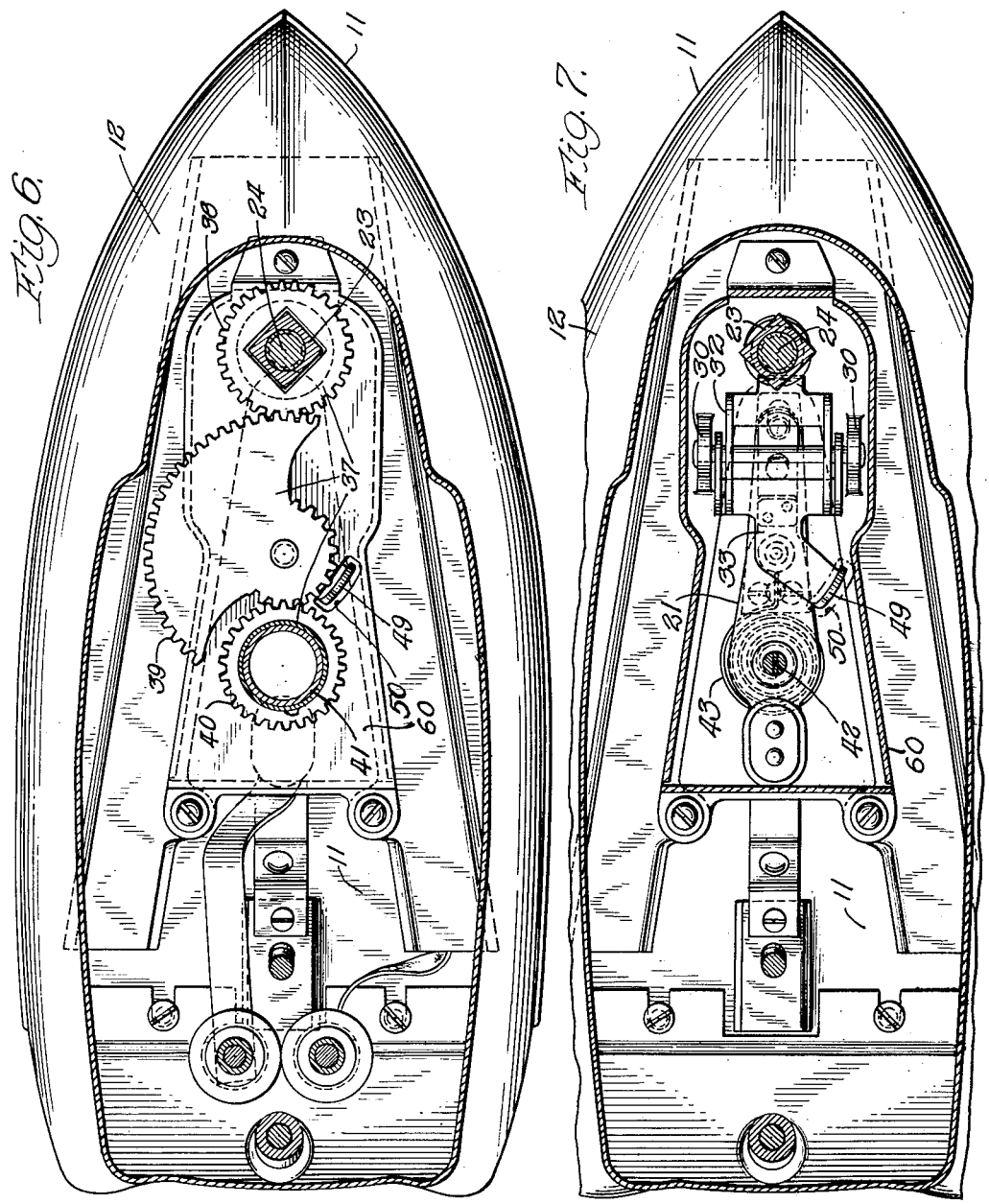

Patented Sept. 18, 1951

2,567,975

UNITED STATES PATENT OFFICE 2,567,975

ELECTRIC IRON

Charles H. Sparklin, Chicago, Ill., assignor to Birtman Electric Company, a corporation of Illinois Application May 4, 1945, Serial No. 591,911

4 Claims. (Cl. 38—74)

This invention relates to a heat regulating iron and more particularly to a sadiron in which heat indicating means are provided for indicating the setting of the thermostat at a point remote from the means of adjusting the same.

In my co-pending application, Serial No. 535,645 filed May 15, 1944, now Patent 2,457,185, dated December 28, 1948, a thermostatic adjustment is positioned in a part of the iron convenient to the fingers with a setting-indicator positioned in the indicia placed with an indicator in a position on the iron convenient to the eye. In my application 535,429, filed May 13, 1944, now Patent 2,439,825, dated April 20, 1948, I disclose and claim superimposition of the setting indicator and the temperature indicator so that the operator may ascertain at a single glance how the actual temperature of the iron corresponds to the pre-determined setting. The present invention is an improvement over that of my above Patent 2,439,825.

In the present invention I have perfected a new iron that provides means for maintaining the finger contacting portion of the heat regulating means in a relatively cool condition. It also provides for sharper control of the temperature by providing a more delicate thermostatic switch.

Figure 1:
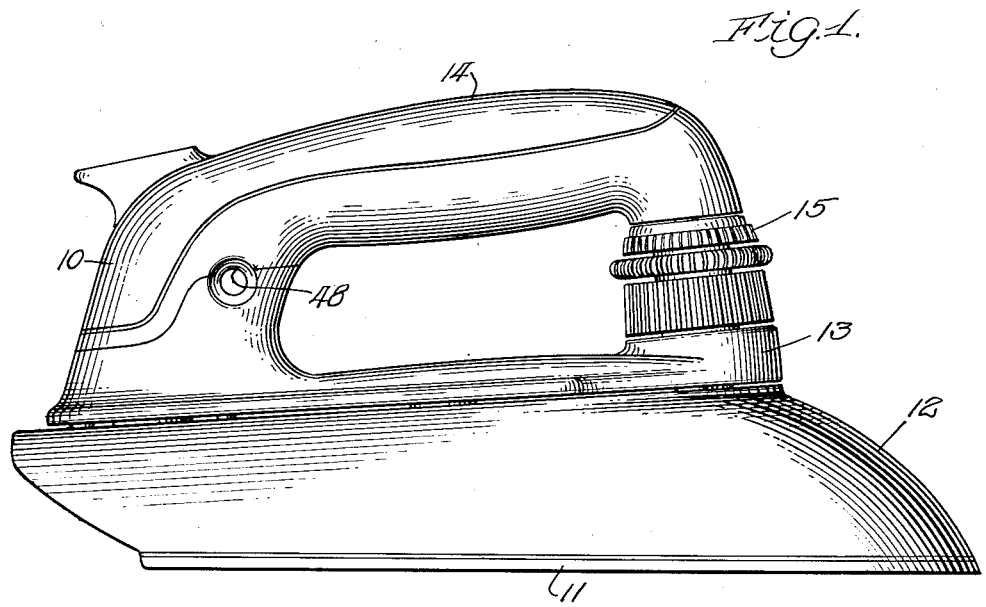
Figure 2:
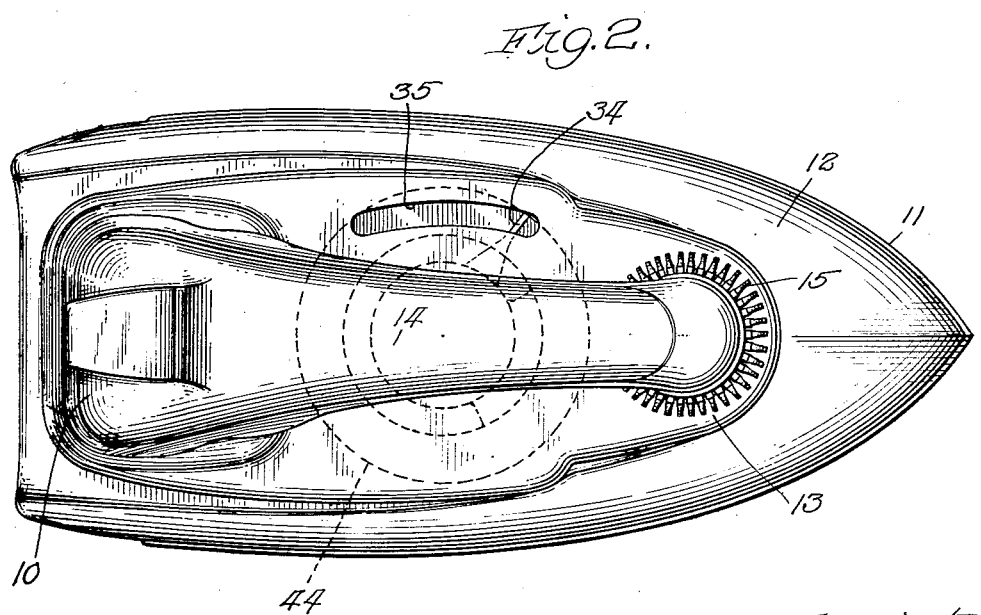

The invention will be described in considerable detail as related to the embodiment of the same set out in the accompanying drawings. Of the drawings, Figure 1 is a side elevation of an iron embodying the features of this invention; Figure 2 is a plan view of the iron of Figure 1; Figure 3 is a side elevation, partially in section; Figure 4 is a section taken along line 4—4 of Figure 3; Figure 5 is a section taken along line 5—5 of Figure 3; Figure 6 is a section taken along line 6—6 of Figure 3; and, Figure 7 is a section taken along line 7—7 of Figure 3.

As shown in the drawings, the iron 10 comprises a sole plate 11 and a hood 12 which together define the body portion of the iron, a handle support 13, a handle 14 containing openings 48 in either side at the rear for positioning an electric cord, and a control knob 15. The usual form of snap acting thermostat 16 is provided in the body of the iron and is affixed to the sole plate 11. This thermostat may be adjusted by a movement of the post 17. The thermostatic control includes a make and break switch having contact points 18. One of these points is mounted on a section of spring steel 19, while the other point is mounted on a short bimetal thermostatic element 20. This second bimetal element is fastened to another section of spring steel 21. The second bimetal element 20 provides sharper control for the switch for when it is heated it curls downward in opposite direction to that of the first bimetal element 16. As the first bimetal element 16 curls upwardly and the second bimetal element 20 curls downwardly when the two are heated, the combination causes the contact points 18 to be separated more rapidly than is true in conventional irons where the contact points are urged apart by a single bimetal element only.

The thermostatic switch is controlled by rotation of the control knob 15 in the following manner. The knob 15 has a central opening in which an internal sleeve 22 is anchored. Within this sleeve is a square nut 23 which is thus turned by turning of the knob 15. This nut contains a threaded post 24 which is rotatably journaled in the sole plate at its bottom and which has a head 25 fastened within a plate 26 in the handle.

The square nut 23 is provided at its base with a collar 27 having a groove 28. A broken rocker arm 29 is pivotally mounted in a pair of brackets 30 (Figs. 3 and 7). This rocker arm is engaged at its front end by the sides of the groove 28. The other end of the rocker arm bears against a post 31 that is fastened to the lower spring steel arm 19 which carries a contact point 18 for the make and break switch. Thus the post 31 serves to position the switch relative to the first bimetal thermostat element 16. The broken rocker arm 29 is constructed so that it acts as a rocker arm in one direction only. This is provided for by having the rocker arm in two sections, each mounted on the same pivot, but with the front section 32 terminating around the rocker in a yoke, the ends of which bear upon the top of the rear section 33 of the rocker arm (see Fig. 7). The positioning of the rocker arm positions the switch relative to the first bimetal thermostat element 16 which controls the temperature at which the iron operates. This positioning is accompanied by rotation of the knob 15. When the knob 15 is rotated, the square nut 23 is moved up or down on the post 24. This moves the collar 27 and thus positions the rocker arm 29 which operates as a rocker only when the collar 27 moves upwardly. When the collar is moved in a downward direction, the rear of the rocker arm is kept in proper position by means of the spring steel section 19 pushing against the rocker arm through post 31. Such a construction is provided so that the rear portion 33 of the rocker arm may serve as a lever fulcrumed at one end around the rocker arm pivot. It functions as a lever when the free end of the rear portion is pushed down. The purpose of this construction will be explained in greater detail hereinafter.

The setting of the thermostat is shown by the indicator 34 (Fig. 5), the end of which points to the indicia 35 mounted below the handle. The indicator 34 is attached to the rotatable mounting 41 for rotation therewith as is shown in Figs. 3, 4 and 5. The indicator 34 is tightly fitted within an annular groove adjacent the top of the mounting 41. The end of the indicator 34 appears through an arcuate opening 36 in the body of the iron. In the particular form shown, this opening passes through the handle support 13. The indicator 34 is operated simultaneously with the setting of the thermostat by means of a gear train 37 connected to the square nut 23. The gear train 37 includes a ring gear 38 having a square central opening. This gear 38 is slidably mounted on the square nut 23 and meshes with the larger circumference of a flat ring reducing gear 39. The smaller circumference of the gear meshes with a toothed arcuate member 40 in the form of a circular gear which is attached to the mounting 41 that bears the indicator 34. As shown in the drawings, gear 40 is tightly fitted within an annular groove in the mounting 41 adjacent the bottom thereof. This mounting 41 is concentric with the shaft 42 and is designed to turn independently of the shaft. As is shown in Fig. 3, each of the gears 38, 39 and 40 of gear train 37 is supported on the support member 60.

The temperature indicator preferably comprises a thermostatic coil 43 secured to the sole plate 11 of the iron in a central location. This coil may be a conventional bimetal material in spiral shape adapted to expand and contract as it heats and cools. At the inner end of the coil there is located a post 42 that is rotatable under the influence of the bimetal coil. The base of the post 42 is rotatably journaled in the sole plate. As a result when the temperature of the sole plate rises, the coil expands and turns the shaft. The temperature indicating means 44 is secured to the neck of the shaft 42 (Fig. 3) and rotates therewith. The temperature indicating means 44 is provided with a top portion 44a rigidly attached to a hub 52 which in turn slidably receives the upper end of the shaft 42. This hub, and thus the indicating means 44, is rigidly locked on the shaft 42 by means of a set screw 51 passing through the hub and bearing against the shaft. This temperature indicating means 44 includes a ring 45 having its circumferential portion underlying the opening 36 and the point of the setting indicator 34. The ring may be painted appropriately, for example, with a red zone, a yellow zone, and a green zone, and is also marked so that whenever the yellow zone underlies the setting indicator 34 the temperature of the iron is the temperature indicated. On the other hand when the red zone underlies the setting indicator the temperature of the iron will be above that required for a particular operating condition, and when the green zone underlies the setting indicator the temperature of the iron will be below that suitable for the preferred operating conditions. The markings on the ring 45 constitute the indicia indicated at 35 (Fig. 2) that is visible through the opening 36. This method of marking and the way in which the setting indicator and the thermometer may be calibrated is explained in detail in my co-pending application referred to hereinabove.

On the rear section 33 of the broken rocker arm there is mounted an upwardly extending arm 49 extending through an opening 50 (Fig. 6) in the plate that supports the gear train 37. The upwardly extending portion is located so that when the control knob 15 is turned to a position corresponding to a high temperature the larger circumference of the ring reducing gear 39 contacts the upper end of arm 49 and pushes the arm 49 down. This serves to push the rear section 33 of the broken rocker arm down and break the contact of the control switch. It can be seen that when the rear portion of the broken rocker arm is used in the above manner it acts as a lever fulcrumed at the point of pivot of the broken rocker arm.

Bearing member 61, which serves as a bearing for the mounting 41, is fastened to support 60 by a hollow neck that extends down through support 60 and is peened over as indicated at 61a. The shaft 42 extends through this hollow neck as shown in Fig. 5.

After the new iron has been built and before it has been put in operation it should be synchronized so that the temperature indicator will coincide with the thermostat setting. This can conveniently be done by means of a headless screw 51 positioned in the hub 52 of the temperature indicating means 44. The screw presses against post 42 that is attached to the bimetal thermostat 43 after the parts have been synchronized. As shown in Figs. 3 and 5, the rotatable post 42 is rotated by means of expansion and contraction of the thermostat 43 as it is heated or cooled. The post 42 extends through a support 60. Mounted on top of the support and substantially concentric with the post 42 is a hollow bearing member 61 of substantially circular cross section. The top end of the post 42 has mounted thereon a temperature indicating means 44 including a ring 45. The ring 45 is depressed beneath that portion of the indicating means which is attached to the post and is separated therefrom over a greater portion of the circumference of the ring. Mounted on the support 60 and around the bearing member 61 is an indicator member 34 having a mounting 41 rotatably mounted on the outer surface of the bearing member 61. The mounting member 41 has attached thereto a toothed arcuate member or gear 40. This gear forms a portion of the gear train 37.

With this construction, the ring 45 is rotatable with the post 42 under the influence of the thermostat 43. The position of the indicator 34 is changed by the operation of the control knob 15 through the gear train 37. As the indicator 34 and the ring member 45, which also serves as an indicator, are in visual alignment through the slot 36, the operator of the iron can easily tell when the iron is too hot or too cold and when it is heated to the temperature corresponding to the temperature setting and thus ready to use.

The invention described and claimed herein is related to that claimed in my prior U. S. Patent 2,439,825, dated April 20, 1948.

The knob 15 which is used to control the operating temperature of the iron, has a finger contacting portion 46 extending beyond the main body portion of the knob. This extended portion is separated from the rest of the knob by deep circular grooves 47 on either side which serve to keep the finger contacting portions 46 cool.

In my copending application Serial No. 700,957, filed October 3, 1946, now Patent No. 2,541,119, issued February 13, 1951, I have disclosed and claimed that portion of the iron including the rocker arm 29 and associated structure for disengaging the control switch of the iron. In my copending application, Serial No. 743,513, filed April 24, 1947, now Patent No. 2,518,503, issued August 15, 1950, I have disclosed and claimed the temperature responsive control switch and associated structure.

The foregoing detailed description has been given for clearness of understanding only, and no unnecessary limitations should be understood therefrom.

I claim:

1. In an electric iron including an electric heating element, temperature indicating means including a bimetal thermostat adjacent said heating element to receive heat therefrom, a post rotatably mounted in said iron, means operatively connecting said thermostat and post so that movement of the thermostat due to temperature changes in the iron causes rotation of said post, a hollow bearing member of substantially circular cross-section adjacent the end of said post that is opposite the heating element, said bearing member being substantially concentric with said post, a temperature indicator member mounted on said post for rotation therewith having a fastening portion within said hollow bearing member, a second indicator member having a portion rotatably mounted on the outer surface of said bearing member and having an indicator portion adjacent said temperature indicator member, an adjustable second bimetal thermostat adjacent said heating element for controlling the flow of electricity to said heating element, and means for simultaneously adjusting said second bimetal thermostat and operating said second indicator member to indicate the operating conditions of the iron, said temperature indicator member and second indicator member being synchronized to indicate the operating conditions of the iron at any given time.

2. The electric iron of claim 1 wherein said means for operating said second indicator member includes a gear element mounted on said portion of the second indicator member that contacts the outer surface of said bearing member and arranged substantially concentric thereto.

3. The electric iron of claim 1 wherein there is provided a support through which said post extends and on which said bearing member is fastened.

4. In an electric iron including an electric heating element, temperature indicating means including a bimetal thermostat adjacent said heating element to receive heat therefrom, a post rotatably mounted in said iron, means operatively connecting said thermostat and post so that movement of the thermostat due to temperature changes in the iron causes rotation of said post, a hollow cup-shaped bearing member of substantially circular cross-section adjacent the end of the post that is opposite the heating element, said bearing member being substantially concentric with said post, a support through which said post extends and on which said bearing member is fastened, a temperature indicator member mounted on said post for rotation therewith having a fastening portion within said bearing member, a second indicator member having a portion rotatably mounted on the outer surface of said bearing member and having an indicator portion adjacent said temperature indicator member, an adjustable second bimetal thermostat adjacent said heating element for controlling the flow of electricity to said heating element, and means for simultaneously adjusting said second bimetal thermostat and operating said second indicator to indicate the operating conditions of the iron, said operating means including a gear element mounted on said portion of the second indicator that contacts the outer surface of said bearing member and arranged substantially concentric therewith, and said temperature indicator member and second indicator member being synchronized to indicate the operating condition of the iron at any given time.

CHARLES H. SPARKLIN.

REFERENCES CITED

The following references are of record in the file of this patent:

UNITED STATES PATENTS

| Number | Name | Date |
|---|---|---|
| 2,195,002 | Clark | Mar. 26, 1940 |
| 2,300,230 | Kuhn et al. | Oct. 27, 1942 |
| 2,353,151 | Elsenheimer | July 11, 1944 |
| 2,439,825 | Sparklin | Apr. 20, 1948 |
| 2,457,185 | Sparklin | Dec. 28, 1948 |